Sept. 4, 1973
W. KREY
3,756,859
LEAK-PROOF GALVANIC CELL EMPLOYING CATION
EXCHANGE COMPOUND SEPARATOR
Original Filed Oct. 19, 1967
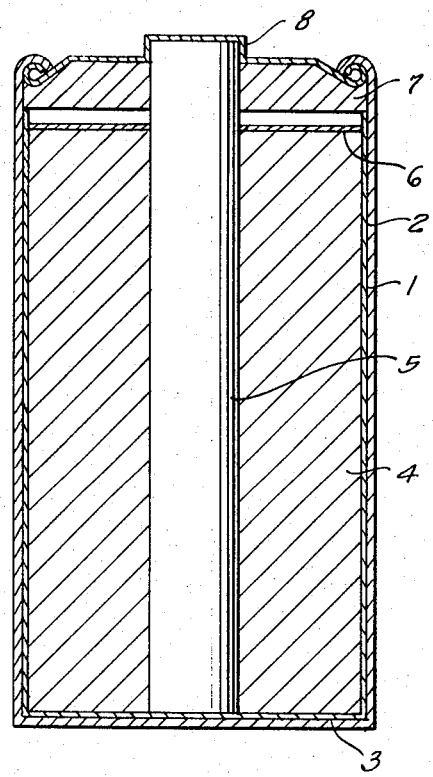
INVENTOR
Winfried Krey
BY
Michael S. Strikes,
ATTORNEY 3,756,859
LEAK-PROOF GALVANIC CELL EMPLOYING CATION EXCHANGE COMPOUND SEPARATOR
Winfried Krey, Neunhaim, Germany, assignor to Varta Pertrix-Union Gesellschaft mit beschrankter Haftung, Ellwangen-Jagst, Germany
Continuation of abandoned application Ser. No. 14,707, Feb. 9, 1970, which is a continuation of application Ser. No. 676,499, Oct. 19, 1967. This application Dec. 17, 1971, Ser. No. 209,357
Int. Cl. H01m 21/00, 3/00
U.S. Cl. 136—107    5 Claims

ABSTRACT OF THE DISCLOSURE

An electric cell is provided with an electrolyte, a depolarizer and a substantially coherent blocking layer disposed between the negative electrode and the depolarizer. The blocking layer comprises a cation exchange compound of a high swelling capacity.

An example of the cation exchange compound is a styrene-divinylbenzene copolymer which includes up to 3 mol percent divinylbenzene as cross-linking agent.

---

This is a continuation of application Ser. No. 14,707, filed February 9, 1970, which in turn was a streamlined continuation of application Ser. No. 676,499, filed Oct. 19, 1967, both now abandoned.

BACKGROUND OF THE INVENTION

Leak-proof electric cells with a weakly acidic thickened electrolyte such as are used in elements of the Leclanche type have the undesirable property that during the discharge a rise of the electrolyte frequently occurs. This may result in leakage of electrolyte from the element and thus may lead to damage to surrounding apparatus.

It appears that the cause of this phenomenon is the high differential in the transport numbers of cations and anions of the electro-chemical reaction products. The transport number of zinc for instance in a primary cell having a zinc chloride type electrolyte is comparatively low as compared with the transport number of the chloride. As a result thereof it occurs that the zinc ions which during the discharge emanate from the negative zinc electrode remain in the immediate proximity of the zinc electrode. Their charge is compensated due to following the trend towards electro-neutrality, by the entry of anions with the high transport number. Thus, eventually a zone of higher salt concentration will form at a place involved.

As a further consequence it has been found that the speedy equalization of concentrations is strongly obstructed wherever the element uses one of the conventional thickening agents, for instance starch, flour, methylcellulose, carboxymethylcellulose, karayagum gelatine, agar agar, pectin, alginate, etc. Considerable osmotic pressure differences thus arise which finally result in a volume increase of the concentrated electrolyte solution. The concentration differential which occurs during the discharge can then be offset only by diffusion. However, the water which is used as solvent diffuses at a substantially higher rate than the dissolved electrolyte salt. Thus, the frequency observed rise of the electrolyte solution occurs in direct neighborhood of the zinc electrode and brings about the leaking of the element since a backflow of the electrolyte solution into the pressed body of the depolarizer is strongly obstructed by the conventional thickening agent.

A control of the transport numbers of the ions in the desired manner could therefore possibly be effected by using ion exchange membranes in the electric primary elements. The transport number of the cations is enlarged if cation exchange membranes are used. For instance, if a cation exchange membrane is used between the negative electrode and the depolarizer this would permit the cations emanating from the anode to pass through the membrane without obstruction during operation of the element while, on the other hand, the solid ions of the exchange compound would form a barrier of electrostatic potential against the entry of anions, since the solid ions would have the same polarity. The current flow through the cation exchanger would therefore take place to an increased degree by means of cations. The transport number of cations in an extreme case would even be close to 1. Thus, an undesirable increase of the electrolyte concentration during the discharge of the element at the phase of the cation exchange compound close to the negative electrode could be prevented. An increase of the electrolyte volume by a certain lowering of the cation transport number could occur only beyond the membranes. This normally is not harmful, since at that point the liquid can penetrate the pressed body of the depolarizer without obstruction. Thus a backing-up of the electrolyte with its undesirable consequences of leakage of the element is prevented.

However, it was not possible up to now to provide an operative element of this type. All so far proposed exchange membranes formed in conventional manner can form an ion blockage but they are not capable of tying down a sufficient amount of electrolyte solution and to provide for adequate wetting of the surface of the electrode. The additional use of a conventional thickening agent would therefore still be necessary in this type of a battery. Such thickening agent however would again be a medium in which during discharge of the cell an increase in the zinc salt concentration would occur and the intended effect would thus be nullified. Only membranes with an almost complete blockage for anions could prevent this phenomenon. Such membranes, however, require a very high solid ion concentration and therefore have only a very limited swelling capacity. They cause an increase of the internal resistance of the cell to an extent that its performance becomes very low and thus no longer requires particular measures against leakage of the electrolyte.

SUMMARY OF THE INVENTION

It is therefore an object of the invention to form a leak-proof electrical element and more specifically an electric element which is provided with a thickening agent that will bind a sufficient amount of electrolyte and will at the same time increase the mobility of the cations and reduce that of the anions and thus prevent a rising of the electrolyte solution in the immediate proximity of the negative electrode.

This object is met by a leak proof electric cell which comprises a positive and a negative electrode, an electrolyte, a depolarizer and a substantially coherent blocking layer disposed between the negative electrode and the depolarizer, the blocking layer comprising at least one granulous swellable cation exchange compound.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The drawing represents a schematic, elevational, cross-sectional view of a leak-proof electric cell according to the present invention.

DESCRIPTION OF THE PREFERRED EMBODIMENTS

As stated, the invention solves the problems presented in this type of electric cell by replacing the conventional thickener with a coherent blocking layer which either consists of grains of a cation exchange material having a high capacity to swell or contains such material. In general, it is sufficient if the cation exchange compound can absorb water to an extent of 3 times its dry weight. It is however preferred if this factor amounts to between 5 and 10.

The size of the grains of the cation exchange compound should not be in excess of 200 microns, since otherwise the layer may be easily too thick and besides increases the danger of pitting. A grain size between 20 and 70 microns is preferred.

In a preferred embodiment, a small addition of a suitable binding agent to the grains of the blocking layer will combine the grains into a dense separator body.

The following is an example of a specific embodiment of the invention and of a process of making the same, and is not intended to limit the invention to the specific details described therein.

A 5% solution of polyisobutylene with a molecular weight of 50,000 in benzene was applied, in an amount of 3 ml., to the inside wall of a rotating zinc cup. The zinc cup had a useful peripheral surface of 43 cm.$^2$ and a wall thickness of .045 mm. In this manner a uniform liquid film was produced on the inside of the zinc cup.

Other binding agents which could be used would be solutions of chloroprene or butadiene-acrylonitrile in acetone.

Thereupon an amount of 0.5 g. of a dried finely pulverized polystyrene-sulfonic acid of a small degree of cross-linking (divinylbenzene content 0.6 mol percent) is applied by dusting to this coating of the inner wall of the cylinder. The grain size was in a range of about 40 microns. The sulfonated styrene-divinylbenzene copolymer thus entered the coat on the inside wall of the zinc cup and, after evaporation of the solvent, formed a uniform closely adhering separator coating.

The depolarizer mass and a carbon rod were then fixed to the thus treated cup by a pressing operation. The bottom of the cup was formed by an insulating layer. The depolarizer employed had the following composition:

| | Parts by wt. |
|---|---|
| Manganese dioxide | 87 |
| Carbon blank | 13 |
| Zinc chloride solution with a density of 1.35 | 60 |
| Zinc oxide | 0.5 |
| Karaya gum | 0.5 |

An alternative form of making the element may be described as follows:

Instead of first applying a solution of the binding agent and then dusting into the thus formed coating the powder of the cation exchange compound it is also possible to apply a suspension of the finely pulverized cation exchange in a solution of the binding agent to the internal wall of the metal cup which preferably should be a zinc cup, and which preferably should rotate during such application. By this method there is also formed an uneven film on the inside of the cup from which the solvent of the binding agent can easily be removed in the conventional manner for instance by evaporation.

The process described results in a fully leak-proof element. No electrolyte solution will escape from this element even under maximum stress for instance under conditions of a short circuit. Additional design measures such as the use of absorbent materials or special steel or synthetic enclosures are no longer necessary to prevent leakage. It is also possible to dispense with the conventionally extra space for expansion of the electrolyte.

The element of the invention even permits to increase the capacity yield further by increasing the amount of eletrolyte without jeopardizing the leakage properties. For instance, it is possible to use 70 parts by weight of zinc chloride solution with the above described depolarizer. The element of the invention in addition to its leak-proof property has the further advantage of a capacity yield which is higher by between 15 and 25% in case of severe discharges such as in continuous discharge across 4 ohm up to 0.75 v. in comparison to the conventional elements which have a paper lined cup and use a thickener consisting of starch and/or methylcellulose (tylose). All this is possible because no electrolyte solution is withdrawn from the depolarizer pressed body during the discharge. The partial replacement of the easily mobile anions by the solid ions of the cation exchange material is very favorable for the cation transfer since it reduces the possibility to form zinc complexes with the anions present in the electrolyte such as Cl$^-$ and OH$^-$ and thus increases the absolute value of the mean ion mobility of the zinc. This advantage is obtained wherever a zinc-chloride solution is used as electrolyte. The same applies however also to other complex-forming cations.

The capacity yield, the short circuit current strength and the storage properties of the element are dependent on the swelling capacity and thus the crosslinking degree and the exchange capacity of the exchange material (note: "Ionenaustauscher" by F. Helfferich, vol. I, 1959, particularly pages 92–96, published by Chemie G.m.b.H. Weinheim, Bergstr., Germany). This advantage is obtained by replacing in accordance with the teachings of the invention the conventional thickener with a synthetic highly acidic ion exchange material such as a polystyrenesulfonate.

The criterion for the usefulness of a cation exchanger of the invention may therefore be found, apart from the cross-linking degree which is not easily determined, in the water content W° of the exchanger that is in equilibrium with distilled water and charged with H+ ions and also in the total weight capacity GK. The water content W° is defined as gram water per one gram dry weight of the exchanger that has been charged with H+ ions.

The total weight capacity GK is equal to the quotient as follows:

$$\frac{\text{The reagent consumed during titration in mval.}}{\text{Dry weight of specimen in grams}}$$

All cation exchange compounds that have a high capacity of swelling and are not oxidizable may be used and preferably those on the basis of a polystyrene sulfonic acid or sulfonated phenol-aldehyde polycondensation products with a water content of W° no less than 3 and a weight capacity GK no less than 2 mval./g. This requirement is met by a polystyrene sulfonic acid with a cross-linking degree of not more than 3% divinylbenzene.

Certain details of the present invention will now be described, by way of example, with reference to the drawing.

A suspension is sprayed onto the interior wall of rotating zinc cup 1 in an amount of 1 ml.

The composition of the suspension may be as follows:

(A) Sodium polystyrene sulfonate of low degree of cross-linking: The water content of the specific amount of exchanger, the latter being in equilibrium with distilled water, is as follows: W°=8 g./g., corresponding to a nominal content of divinyl benzene (DVB) equal to 0.8 mol percent. Total weight capacity=5.3 mval./g. The exchanger is dried, ground and screened. Particle size 0.04 mm., 10 g.

(B) Acetone, 9 g.

(C) Methylisobutylketone, 3 g.

(D) Butadiene-acrylonitrile-mixed polymerizate, 20% in acetone, 5.5 g.

The first constituent (A) of this suspension may also consist of a mixture of polystyrene sulfonates of different degrees of cross-linking, provided that the total swelling capacity of the mixture conforms to the required conditions. For instance, a mixture of (a) Sodium polystyrene sulfonate, $W°=4$ g./g., corresponding to a nominal DVB content of 2 mol percent, 6.7 g.

and (b) Sodium polystyrene sulfonate, $W°=16$ g./g., corresponding to a nominal DVB content of about 0.5 mol percent, 3.3 g.

In substantially similar manner, it is also possible to prepare suspensions with other cation exchangers, for instance on the basis of slightly cross-linked acrylic acid-acrylic acid amide, or acrylic acid-divinylbenzene, or sulfonated phenol-aldehyde copolymers as condensation products.

Within a few seconds of drying time after application of the suspension to the inner wall of cup 1, the suspension will remain stationary and, after complete drying, will form a swellable separator coating 2 of the desired properties.

To produce the completed cells, the bottoms of the thus coated cups are covered with disks 3 of synthetic material, and depolarizer mass 4 is directly sprayed into the interior of the cups or inserted as a preshaped pressed body. This body is then covered at its upper end with an annular disk 6 of a synthetic fiber fleece and then carbon rod 5 is inserted into the depolarizer body. Thereby, since the carbon rod preferably has a somewhat larger diameter than the axial bore of the depolarizer body, the latter is firmly and uniformly pressed against separator coating 2.

The cells may now be closed in conventional manner, for instance with a packing 7, and a terminal cap 8. The expansion space provided in conventional cells may be dispensed with, with the exception of the provision of a relatively small space to permit accommodation of depolarizer bodies the dimensions of which may vary within established tolerances.

The lower limit of divinylbenzene content of the polystyrene sulfonic acid is generally dictated by practical considerations such as the increased costs of the working-up of the more and more swellable resins. Cost considerations might set a higher figure for the lower limit than the minimum proportion required for producing leak-proof cells. For this reason, generally, resins or resin mixtures of a mean cross-linking degree below 0.5% DVB or water absorption $W°=20$ g./g. will not be of practical interest, except that such products may be economically used as constituents of a mixture which also includes less swellable resins.

It will be understood that each of the elements described above, or two or more together, may also find a useful application in other types of electric cells differing from the types described above.

While the invention has been illustrated and described as embodied in leak-proof electric cells including a zinc cup electrode it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims.

I claim:

1. A leak-proof galvanic cell, comprising, in combination, a positive electrode; a negative electrode spaced from said positive electrode and having an exposed surface facing towards the same; a body containing depolarizer and electrolyte and being accommodated in the space between said electrodes; and an ion-permeable film covering said exposed surface and physically separating said negative electrode from said depolarizer and electrolyte of said body while providing ion-conduction and water transport therebetween, said film having a thickness which is only a small fraction of the thickness of said body and being composed of a non-swellable inert binder and at least one swellable granular cation-exchange compound which is bound by said binder and has a granule size up to 200 microns and a water absorbing capacity equal to at least three times its dry weight.

2. A galvanic cell as defined in claim 1, wherein said cation-exchange compound has a water absorption capacity equal to between five and ten times its dry weight.

3. A galvanic cell as defined in claim 1, wherein said cation-exchange compound comprises granules based on a polystyrene sulfonic acid cross-linked with from 0.5% to 3% of divinylbenzene.

4. A galvanic cell as defined in claim 1, wherein said negative electrode is in form of a zinc cup and said depolarizer is essentially manganese dioxide.

5. A galvanic cell as defined in claim 4, wherein the granule size of said cation-exchange compound is between 20 and 70 microns and its swelling capacity in water is between five and ten times its dry weight.

References Cited

UNITED STATES PATENTS

| | | | |
|---|---|---|---|
| 2,366,007 | 12/1944 | D'Alelio | 260—2.2 |
| 2,607,809 | 8/1952 | Pitzer | 136—83 |
| 2,861,116 | 11/1958 | Grubb, Jr. | 136—106 |
| 3,018,316 | 1/1962 | Higgins et al. | 136—144 |
| 3,479,223 | 11/1969 | Duddy et al. | 136—6 |
| 3,558,364 | 1/1971 | Krey | 136—83 |

ANTHONY SKAPARS, Primary Examiner

U.S. Cl. X.R.

136—146